United States Patent [19]

Sumner, Jr. et al.

[11] 4,265,298

[45] May 5, 1981

[54] MICROCOMPUTER CONTROL FOR SUPPLEMENTAL HEATING WITH NIGHT SET-BACK

[75] Inventors: Lee E. Sumner, Jr., Dallastown; Kenneth W. Cooper, York; Frederic H. Abendschein, Columbia, all of Pa.

[73] Assignee: Borg-Warner Corporation, Chicago, Ill.

[21] Appl. No.: 80,362

[22] Filed: Sep. 28, 1979

[51] Int. Cl.³ .............................................. F28B 29/00
[52] U.S. Cl. ......................................... 165/2; 165/12; 165/29
[58] Field of Search ................................ 165/12, 29, 2

[56] References Cited

U.S. PATENT DOCUMENTS 4,158,383  6/1979  Rayfield ........................... 165/29 X Primary Examiner—Albert W. Davis
Attorney, Agent, or Firm—Thomas B. Hunter

[57] ABSTRACT

An apparatus and method for controlling the sequential operation of supplemental electric heaters so that the amount of energy consumption is minimized. The operation of the heaters is prevented as long as a lower night set-back temperature can reach the higher reference set point during the daytime within a predetermined time interval. A microprocessor is provided to control the operation of night set-back automatically to affect a measured temperature of the conditioned space.

6 Claims, 2 Drawing Figures

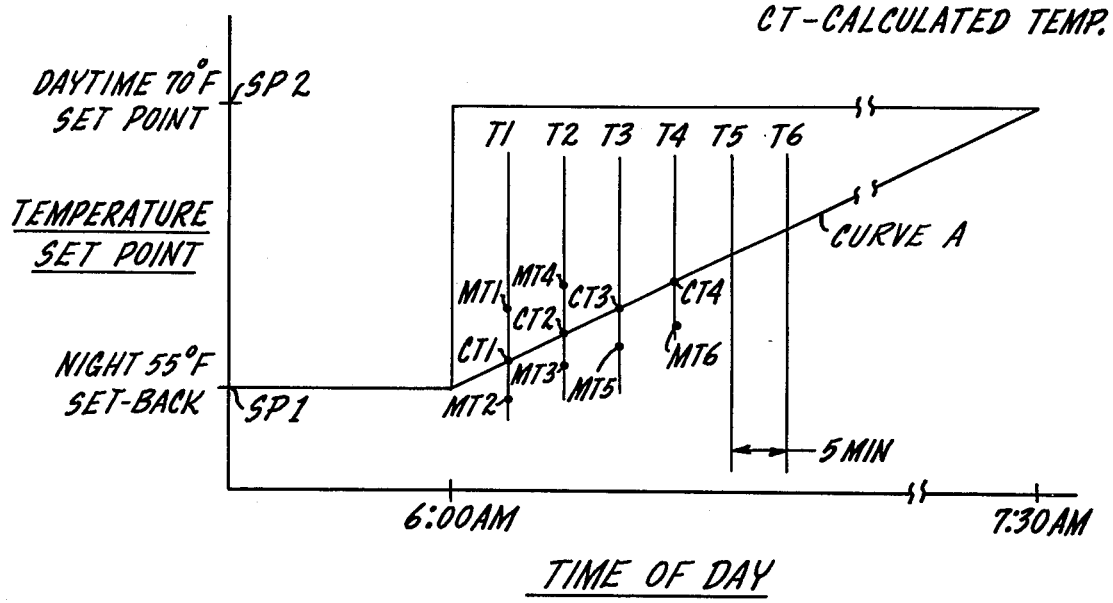

MICROCOMPUTER CONTROL FOR SUPPLEMENTAL HEATING WITH NIGHT SET-BACK

CROSS-REFERENCE TO RELATED APPLICATIONS

Reference is made to the patent application entitled "Microcomputer Control for Supplemental Heating in a Heat Pump" which was filed on the same day with three of the names being of the same inventors as in this application and was assigned to Borg-Warner Corporation, assignee of the present invention. The entire disclosure of the previously mentioned title is specifically incorporated herein by reference as if the same were repeated fully.

BACKGROUND OF THE INVENTION

This invention relates generally to heat pumps and refrigeration systems and more particularly, it relates to an apparatus and method for controlling the operation of supplemental electric heaters so that the amount of energy consumption is minimized. The present invention includes a micro-processor with a program for achieving set-back automatically so as to reduce the temperature setting of a conditioned space during nighttime periods. The invention has particular applications in heat pumps for heating residential dwellings, small office buildings, mobile homes and the like.

In order to minimize the operation of supplemental electrical heaters and thus reduce energy consumption, the set point of the desired or referenced temperature in the conditioned space is set back or changed to a lower temperature reference point during nighttime periods. In the case of a commercial building, this is done when there are no occupants in the conditioned space such as when the building is closed for the night, i.e., 11 p.m. to 6 a.m. The reference temperature is typically set back to 55° F. during this unoccupied period. A microprocessor under the control of a program is utilized to prevent the operation of the supplemental electric heaters as long as the higher reference set point temperature during the daytime can be reached within a pre-determined time interval.

SUMMARY OF THE INVENTION

Accordingly, it is a general object of the present invention to provide a new and improved heat pump and refrigeration system having night set-back so as to minimize energy consumption.

It is another object of the present invention to provide an apparatus and method for controlling supplemental electric heaters by preventing the operation thereof as long as the heat pump alone can bring the conditioned space from a lower night set-back temperature up to the higher referenced day-time set point within a pre-determined time interval.

It is another object of the present invention to provide an apparatus and method for use in a heat pump and refrigeration system which includes set-back means for activating sequentially a plurality of electric heaters when the measured temperature of the conditioned space at a particular sampling time is less than the corresponding calculated temperature for that sampling time for a pre-selected number of sampling times.

It is still another object of the present invention to provide an apparatus utilizing a microprocessor to control the operation of night set-back and a day-time reset automatically to affect a measured temperature of the conditioned space.

In accordance with these aims and objectives of the instant invention, there is provided a heat pump and refrigeration system for conditioning a space which includes a closed refrigerant circuit consisting of a compressor, a condenser, an expansion device, and an evaporator connected respectively in series. The system has a first sensing means for measuring the temperature of the space to be conditioned to generate an electrical signal representative of the measured temperature. A first thermostat is provided for setting a first lower referenced temperature during the nighttime of the space to be conditioned, and a second thermostat is utilized for setting a second higher referenced temperature during the daytime, the thermostats producing second and third electrical signals representative of the respective selected nighttime and daytime reference temperatures. A plurality of supplemental electric heaters are provided for generating heat to the conditioned space. A programmed control device means in response to the measured temperature and referenced temperatures produces a signal to activate the supplemental electric heaters. A night set-back means automatically changes from the first referenced temperature on the first thermostat to the second temperature on the second thermostat at a predetermined time of day. The plurality of electric heaters are activated when the measured temperature at a particular sampling time is less than the corresponding calculated temperature for that sampling time for a pre-selected number of sampling times. A microprocessor having a program is operatively connected to the programmed control device and the night set-back means for controlling the operation thereof to affect the measured temperature of the conditioned space.

BRIEF DESCRIPTION OF THE DRAWINGS

These and other objects and advantages of the present invention will become more fully apparent from the following detailed description when read in conjunction with the accompanying drawings wherein:

FIG. 2 is a graphical representation showing the operation of the night set-back device.

DETAILED DESCRIPTION OF THE PREFERRED EMBODIMENT

Figure 1:
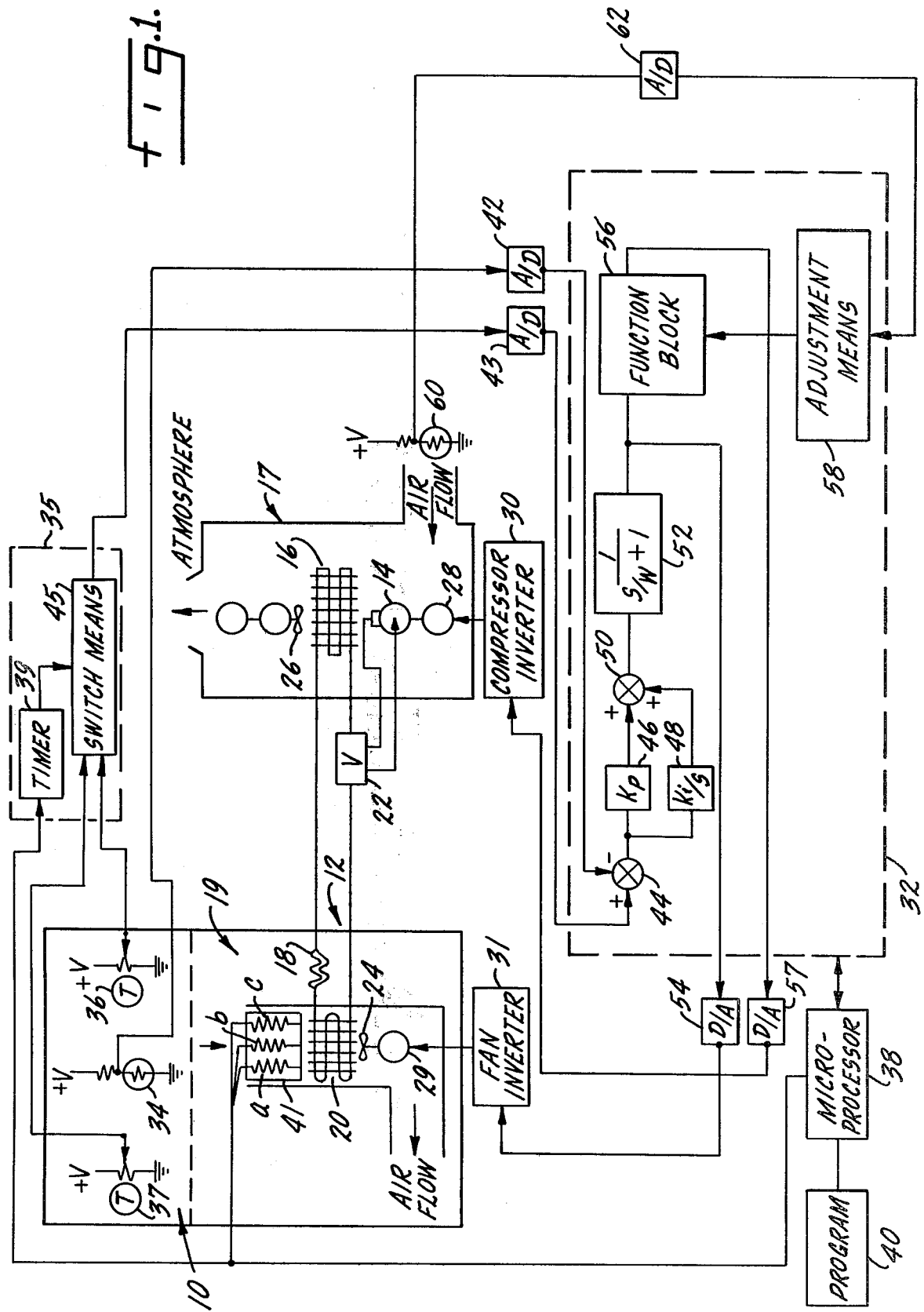
FIG. 1 is an electrical schematic block diagram of the heat pump and refrigeration system in accordance with the present invention.

The operation of the refrigeration system in the heating mode with the supplemental electric heaters is identical to that described and shown in the application mentioned above entitled "Microcomputer Control For Supplemental Heating in a Heat Pump." Only the additional feature of night set-back, which is the subject matter of the present invention, is described fully hereinbelow. While the entire refrigeration system has been shown in FIG. 1, only the unique features of the function block 56 and the adjustment means 58 for operating the supplemental electric heaters 41 under the control of the microprocessor 38 with program 40 will be explained in detail. The invention can be best understood in conjunction with the graph of FIG. 2 showing the typical operation of the system. It should be clear to those skilled in the art that the operating characteristics depicted in FIG. 2 can be programmed directly into the microprocessor 38.

Referring to FIG. 1, a thermostat 36 is utilized to set or select the desired higher temperature reference point of the conditioned space or zone 10 referred to hereafter as the daytime set point. A thermostat 37 is also provided for setting the desired lower temperature reference of the space 10 referred to hereinafter as the nighttime set point. The daytime set point on the thermostat 36 is automatically changed or set-back by night setback 35 means consisting of timer 39 and switch means 45 under the control of the microprocessor 38 with a program 40 to the lower temperature reference on the thermostat 37 at a predetermined time of the day. In the case of heating, the daytime set point is, for example, typically 70° F. and the nighttime set point is 55° F. In a commercial building or plant, the night set-back is done generally some time between 11 p.m. to 6 a.m. when there are no occupants of the conditioned space. At 6 a.m., the night set point is switched automatically back to the higher daytime temperature set point prior to the time when the occupants arrive. A predetermined time interval is selected in which the measured temperature of the conditioned space is to reach the new higher set point, for instance, in a period of 1½ hours. In other words, it is desired that the temperature of the conditioned space reach 70 degrees no later than 7:30 a.m.

During this period between 6 a.m. and 7:30 a.m. the operation of the supplemental electric heaters 41 is prevented if the capacity of the heat pump is sufficient such that the indoor temperature is increasing so that the actual measured temperature in the conditioned space 10 can be expected to reach the higher daytime reference set point by 7:30 a.m. This is accomplished by monitoring at regular time intervals, such as every 5 minutes, the temperature of the conditioned space and comparing it with a corresponding calculated temperature. If the actual measured temperature remains less than the calculated temperature for a particular sampling time for two consecutive sampling times, this is a positive indication that the desired temperature of the conditioned space cannot be expected to reach the higher set point reference within the predetermined time interval. Only then is a first stage 41a of the supplemental electric heaters turned on. Assuming that this is still not sufficient to enable the conditioned space to reach the daytime set point by 7:30 a.m., then second and third stages 41b and 41c of heating are sequentially turned on after the third and fourth consecutive sampling times. All of the electric heaters 41 are turned off whenever the increasing indoor temperature is adequate to provide the desired heating recovery rate.

The output signal from the digital filter 52, which is proportional to the error signal from summer 44 comparing the measured temperature and the referenced temperature, is delivered to the function block 56 for determination of whether the compressor is operating at at least 100% of its rated-speed before allowing operation of the supplemental electric heaters 41. Once the compressor speed criterion has been met, the electric heaters are controlled directly by the error signal. The typical operation of the electric heaters 41a through 41c under the control of the microprocessor 38 is shown in FIG. 2. As can be seen, the lower or nighttime set-back set point SP1 is changed in this preferred embodiment to a new daytime set point SP2 at 6 a.m. from such as 55° F. to 70° F. In normal practice heretofore, this change in set points would activate supplemental electric heaters for adding heat to the conditioned space. However, it has been found that in order to minimize energy consumption and yet still maintain acceptable heat recovery rates the heaters should not be turned on as long as the measured temperature was equal to or above the calculated temperature at a given sampling time as determined in accordance with the curve A. Specifically, as long as the measured temperature such as MT1 at the sampling time T1 in FIG. 2 is equal to or above the calculated temperature such as CT1 at the time T1 the supplemental heaters 41 should not be turned on. This is because of the fact the measured temperature in the conditioned space is rising and can be expected to reach the daytime set point within a predetermined time interval, i.e., 1½ hours or by 7:30 a.m.

Assume that the measured temperature at T1 is only MT2 which is less than CT1. Still no supplemental heat will be activated until after one more sampling interval i.e., T2 where the measured temperature MT3 is again less than the respective new calculated temperature CT2. If at the second consecutive sampling time T2 the measured temperature had increased to MT4, then no supplemental heat would turn on. With the measured temperature being MT3 at the sampling time T2, a first stage 41a of supplemental electric heaters 41 would be turned on. At the next consecutive sampling time T3 if the measured temperature MT5 is still below the corresponding calculated temperature CT3, the second stage 41b of the supplemental electric heaters is turned on. If at time T4, the measured temperature MT6 is less than the corresponding calculated temperature CT4, the third stage 41c is activated. For any number of electric heaters being energized and when the actual measured temperature is equal to or above the calculated temperature, all of the heaters are turned off. The process for turning back on the heaters is repeated as described above to keep the heat recovery rate along the calculated line of FIG. 2.

While only three stages of supplemental electric heaters have been shown, it should be apparent that any number of stages could be added to affect the desired temperature conditions of the space. It should also be clear that the control of the heaters by waiting two consecutive time intervals can be changed in any number of ways. The sampling intervals are generally equally spaced apart and can be of any interval such as 5 minutes. As can be appreciated, the rate of recovery of the actual measured temperature is dependent upon the outdoor temperature. Thus, an adjustment means 58 is provided within the control means 32 to absolutely prevent the use or activation of the electric heaters 41 when the outdoor temperature is above a predetermined value such as 50° F. This is because the heat pump will always be able to raise the temperature of the conditioned space without the aid of electric heaters when the outdoor temperature is above 50° F. A thermistor 60 is included to generate an electrical analog signal representative of the outdoor atmospheric temperature and is sent through an A/D converter 62 to the adjustment means 58. The output of the adjustment means 58 is fed as another input to the function block 56.

Thus, it can be seen that there is provided an apparatus and method for controlling sequentially the addition of supplemental electric heaters to operate about an optimal path for minimizing energy consumption. All of the supplemental electric heaters are disconnected whenever the measured temperature at a given sampling time is high enough.

While there has been illustrated and described what is considered at present to be a preferred embodiment of the present invention, it will be understood by those skilled in the art that various changes and modifications may be made and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out this invention, but the invention will include all embodiments falling within the scope of the appended claims.

What is claimed:

1. A heat pump and refrigeration system for conditioning a space and having a closed refrigerant circuit including a compressor, a condenser, an expansion device, and an evaporator connected respectively in series, said system comprising:
   first sensing means for measuring the temperature of a space to be conditioned and generating an electrical signal representative of the measured temperature;
   means for setting at least a first lower reference temperature of the conditioned space and at least a second higher reference temperature of the conditioned space;
   heating means including at least three stages of supplemental electric heaters for generating of heat to the conditioned space;
   second sensing means for measuring the temperature of the outdoor atmospheric temperature and generating a second electrical signal representative of the outdoor temperature;
   programmed control means responsive to said first sensing means, said setting means, and said second sensing means for generating a signal to activate said heating means;
   set-back means for automatically changing said setting means from said first reference temperature to said second reference at a predetermined time of day;
   said control means activating a first one of said three stages of electric heaters when the measured temperature at a particular sampling time is less than a corresponding calculated temperature for that sampling time for at least two consecutive sampling times; and
   data processor means having a program coupled to said control means and said set-back means for controlling the operation thereof to affect a measured temperature of the conditioned space.

2. A system as claimed in claim 1, wherein said control means further activates sequentially a second one of said three stages of electric heaters when the measured temperature at a particular sampling time is still less than the corresponding calculated temperature for that sampling time for an additional consecutive sampling time.

3. A refrigeration system as claimed in claim 1, wherein said programmed control means includes a first summer which compares the actual measured temperature with the reference temperature to provide an error signal.

4. A refrigeration system as claimed in claim 1, wherein said data processor comprises a microprocessor.

5. A refrigeration system as claimed in claim 1, wherein each of said first and second sensing means comprises a thermistor.

6. A method for use in a heat pump and refrigeration system for conditioning a space having a closed refrigerant circuit including a compressor, a condenser, an expansion device, and an evaporator connected respectively in series, said method comprised in the steps of:
   sensing the temperature of a space to be conditioned to generate an electrical signal representative of the measured temperature;
   setting a first lower reference temperature during the nighttime of the space to be conditioned and setting second higher reference temperature during the daytime to generate a second electrical signal representative of the selected reference temperature;
   sensing the temperature of the outdoor atmosphere to generate a third electrical signal representative of the outdoor atmospheric temperature;
   providing at least three stages of supplemental electric heaters to generate heat to the conditioned space;
   providing a programmed control device to generate a signal to activate the electric heaters in response to the measured temperature, the reference temperature and the outdoor atmospheric temperature;
   changing automatically through a set-back device from the first reference temperature to the second reference temperature at a predetermined time of day;
   activating one of the three stages of electric heaters through the control device when the measured temperature at a particular sampling time is less than a corresponding calculated temperature for that sampling time for at least two consecutive sampling times; and
   controlling through a microprocessor having a program the step of generating the signal to activate the supplemental electric heaters to affect the measured temperature of the conditioned space.

* * * * *